United States Patent
Albertus et al.

(10) Patent No.: US 9,543,625 B2
(45) Date of Patent: Jan. 10, 2017

(54) METAL/OXYGEN BATTERY WITH MULTISTAGE OXYGEN COMPRESSION

(71) Applicant: Robert Bosch GmbH, Stuttgart (DE)

(72) Inventors: Paul Albertus, Washington, DC (US); John F. Christensen, Mountain View, CA (US); Timm Lohmann, Mountain View, CA (US); Boris Kozinsky, Waban, MA (US); Nikhil Ravi, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 14/184,964

(22) Filed: Feb. 20, 2014

(65) Prior Publication Data
US 2014/0232349 A1    Aug. 21, 2014

Related U.S. Application Data

(60) Provisional application No. 61/767,596, filed on Feb. 21, 2013.

(51) Int. Cl.
*H01M 12/08* (2006.01)
*B60L 1/00* (2006.01)
(Continued)

(52) U.S. Cl.
CPC .............. *H01M 12/08* (2013.01); *B60L 1/003* (2013.01); *B60L 1/08* (2013.01); *B60L 11/1874* (2013.01);
(Continued)

(58) Field of Classification Search
CPC ....... H01M 12/08; B60L 11/1879; B60L 1/08; B60L 1/003; B60L 11/1874; B60L 2240/545; B60L 2240/36; Y02T 10/7011; Y02T 10/705; Y02T 10/7005
See application file for complete search history.

(56) References Cited

U.S. PATENT DOCUMENTS 4,084,038 A * 4/1978 Scragg ................... F01K 3/188
                                                        376/317
5,277,994 A * 1/1994 Sprouse ............. H01M 8/04119
                                                    204/DIG. 4
(Continued)

FOREIGN PATENT DOCUMENTS

DE    102004051359 A1    6/2005

OTHER PUBLICATIONS

International Search Report and Written Opinion corresponding to PCT Application No. PCT/US2014/017379, mailed Apr. 22, 2014 (9 pages).
(Continued)

*Primary Examiner* — Naum B Levin
(74) *Attorney, Agent, or Firm* — Maginot Moore & Beck LLP

(57) ABSTRACT

A vehicular battery system includes an oxygen reservoir having a first outlet and a first inlet, a multistage compressor supported by the vehicle and having a second inlet and a second outlet, the second outlet operably connected to the first inlet, a cooling system operably connected to the multistage compressor and configured to provide a coolant to the multistage compressor to cool a compressed fluid within the multistage compressor, and a vehicular battery system stack including at least one negative electrode including a form of lithium, the vehicular battery system stack having a third inlet removably operably connected to the first outlet, and a third outlet operably connected to the second inlet.

20 Claims, 6 Drawing Sheets

(51) Int. Cl.
*B60L 1/08* (2006.01)
*B60L 11/18* (2006.01)

(52) U.S. Cl.
CPC ......... *B60L 11/1879* (2013.01); *B60L 2240/36* (2013.01); *B60L 2240/545* (2013.01); *Y02T 10/7005* (2013.01); *Y02T 10/705* (2013.01); *Y02T 10/7011* (2013.01)

(56) References Cited

U.S. PATENT DOCUMENTS

| | | | | |
|---|---|---|---|---|
| 5,487,955 A * | 1/1996 | Korall | ................. | H01M 6/5038 429/113 |
| 6,089,830 A * | 7/2000 | Harte | ................. | F04C 23/001 417/253 |
| 6,102,665 A * | 8/2000 | Centers | ................. | F04B 49/10 417/17 |
| 6,127,061 A * | 10/2000 | Shun | ................. | H01M 4/96 429/133 |
| 6,379,828 B1 * | 4/2002 | Worth | ................. | H01M 2/38 429/406 |
| 6,629,525 B2 * | 10/2003 | Hill | ................. | A61M 16/10 128/202.26 |
| 6,688,122 B2 * | 2/2004 | Matsuoka | ................. | B60H 1/3205 62/134 |
| 6,889,512 B2 * | 5/2005 | Ebara | ................. | B60H 1/00007 62/228.5 |
| 7,045,232 B1 * | 5/2006 | Duebel | ................. | H01M 8/0612 429/412 |
| 7,087,331 B2 * | 8/2006 | Keefer | ................. | B01D 53/047 429/411 |
| 7,128,103 B2 * | 10/2006 | Mitlitsky | ................. | H01M 8/04089 141/197 |
| 7,189,467 B2 * | 3/2007 | Wakabayashi | .... | H01M 8/04029 429/429 |
| 7,279,029 B2 * | 10/2007 | Occhialini | ................. | B01D 53/047 128/205.12 |
| 7,424,727 B2 * | 9/2008 | Tanaka | ................. | H05K 7/20736 720/649 |
| 7,758,988 B2 * | 7/2010 | Keefer | ................. | B01D 53/047 429/412 |
| 8,055,388 B2 * | 11/2011 | Mann, III | ................. | B64F 1/364 700/21 |
| 8,173,311 B2 * | 5/2012 | Lienkamp | ................. | H01M 8/04029 429/428 |
| 8,187,737 B2 * | 5/2012 | Fischel | ................. | H01M 2/38 429/416 |
| 8,298,692 B2 * | 10/2012 | Hermann | ................. | H01M 8/04089 180/65.1 |
| 8,381,658 B1 * | 2/2013 | Miller | ................. | B61C 7/04 105/26.05 |
| 8,448,460 B2 * | 5/2013 | Dogariu | ................. | B60H 1/00278 62/178 |
| 8,962,208 B2 * | 2/2015 | Mussro | ................. | H01M 8/04992 429/444 |
| 8,968,942 B2 * | 3/2015 | Pulskamp | ................. | H01M 4/9008 429/403 |
| 9,105,931 B2 * | 8/2015 | Sato | ................. | H01M 4/13 |
| 2003/0175564 A1 * | 9/2003 | Mitlitsky | ................. | H01M 8/04089 141/18 |
| 2005/0095488 A1 * | 5/2005 | Formanski | ................. | F04B 25/00 429/434 |
| 2006/0055175 A1 * | 3/2006 | Grinblat | ................. | F03B 13/26 290/54 |
| 2007/0077459 A1 * | 4/2007 | Walton, II | ................. | H01M 8/04014 429/436 |
| 2009/0239132 A1 * | 9/2009 | Johnson | ................. | H01M 2/1094 429/61 |
| 2010/0143807 A1 | 6/2010 | Khasin et al. | | |
| 2011/0000182 A1 * | 1/2011 | Lasker | ................. | F02C 1/04 60/39.24 |
| 2011/0104576 A1 * | 5/2011 | Johnson | ................. | B82Y 30/00 429/405 |
| 2011/0143226 A1 | 6/2011 | Pulskamp et al. | | |
| 2012/0040253 A1 | 2/2012 | Hermann | | |
| 2013/0084474 A1 * | 4/2013 | Mills | ................. | H01M 4/9016 429/9 |
| 2013/0344401 A1 * | 12/2013 | Albertus | ................. | H01M 12/08 429/403 |
| 2014/0232354 A1 * | 8/2014 | Albertus | ................. | H01M 8/04373 320/137 |
| 2014/0234730 A1 * | 8/2014 | Albertus | ................. | B60L 11/1861 429/403 |
| 2014/0272611 A1 * | 9/2014 | Albertus | ................. | H01M 12/08 429/405 |

OTHER PUBLICATIONS

Abraham et al., "A polymer electrolyte-based rechargeable lithium/oxygen battery", Journal of the Electrochemical Society; 1996; pp. 1-5; vol. 143, No. 1; Norwood, USA (5 pages).

Amatucci et al., "Flouride based electrode materials for advanced energy storage devices," Journal of Flourine Chemistry; 2007; pp. 243-262; vol. 128, No. 4; Elsevier; North Brunswick, USA (20 pages).

Beattie et al., "High-Capacity Lithium-Air Cathodes", Journal of the Electrochemical Society; 2008; vol. 156; Canada (13 pages).

Cabana et al., "Beyond Intercalation-Based Li-Ion Batteries: The State of the Art and Challenges of Electrode Materials Reacting Through Conversion Reactions", Advanced Materials; 2010; pp. E170-E192; vol. 22, No. 35; Wiley; Europe (23 pages).

Kumar et al., "A Solid-State, Rechargeable, Long Cycle Life Lithium-Air Battery", Journal of the Electrochemical Society; 2010; pp. A50-A54; vol. 157, No. 1; Needham, USA (5 pages).

Ogasawara et al., "Rechargeable Li2O2 Electrode for Lithium Batteries", Journal of the American Chemical Society; 2006; pp. 1390-1393; vol. 128, No. 4; Switzerland (4 pages).

Read, "Characterization of the Lithium/Oxygen Organic Electrolyte Battery," Journal of the Electrochemical Society; 2002; pp. A1190-A1195; vol. 149; Army Research Laboratory, Adelphi, USA (6 pages).

Read et al., "Oxygen Transport Properties of Organic Electrolytes and Performance of Lithium/Oxygen Battery", Journal of the Electrochemical Society; 2003; pp. A1351-A1356; vol. 150, No. 10; Army Research Laboratory, Adelphi, USA (6 pages).

USABC Goals for Advanced Batteries (1 page).

Yang et al., "The effect of oxygen pressures on the electrochemical profile of lithium/oxygen battery", Journal of Solid State Electrochemistry; 2010; pp. 109-114; Springer-Verlag; China (6 pages).

Zheng et al., "Theoretical Energy Density of Li-Air Batteries", Journal of the Electrochemical Society; 2008; pp. A432-A437; vol. 155, No. 6; USA (6 pages).

Christensen et al., "A Critical Review of Li/air Batteries," Journal of the Electrochemical Society; 2012; vol. 159(2) R1-R30, USA (30 pages).

Hutchings et al., "Electrochemical oxygen separation and compression using planar cosintered ceramics," Solid State Ionics; 2008; vol. 179 pp. 442-450, Salt lake City, USA (8 pages).

Riley et al., "Conformal Surface Coatings to Enable High Volume Expansion Li-Ion Anode Materials," ChemPhysChem; 2010; vol. 11 pp. 2124-2130, Weinheim Germany (8 pages).

Leung et al. "Using atomic layer deposition to hinder solvent decomposition in lithium ion batteries: first principles modeling and experimental studies," Journal of the American Chemical Society, 2011, vol. 133(37) pp. 14741-14754, USA (40 pages).

Leung et al. "Using atomic layer deposition to hinder solvent decomposition in lithium ion batteries: first principles modeling and experimental studies," Journal of the American Chemical Society, 2011, vol. 133(37) pp. 14741-14754, USA (14 pages).

Strobel et al. "The compression of hydrogen in an electrochemical cell based on a PE fuel cell design," Journal of Power Sources 105 (202) pp. 208-215 (8 pages).

* cited by examiner

METAL/OXYGEN BATTERY WITH MULTISTAGE OXYGEN COMPRESSION

This application claims priority under 35 U.S.C. §119 to U.S. Provisional Application No. 61/767,596, filed on Feb. 21, 2013, the disclosure of which is incorporated herein by reference in its entirety.

FIELD

This invention relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. As discussed more fully below, a typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2 Li_{Li}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), Zn, Al, Si, Mg, Na, Fe, Ca, and others. In addition, other negative-electrode materials, such as alloys of multiple metals and materials such as metal-hydrides, also have a high specific energy when reacted with oxygen. Many of these couples also have a very high energy density Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. While lithium/oxygen cells have been demonstrated in controlled laboratory environments, a number of issues remain before full commercial introduction of a lithium/oxygen cell is viable as discussed further below.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 52 is enclosed by a barrier 66. The barrier 66 in FIG. 3 is configured to allow oxygen from an external source 68 to enter the positive electrode 54 while filtering undesired components such as gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

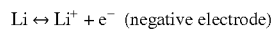

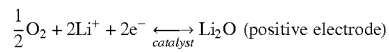

-continued

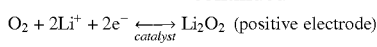
$O_2 + 2Li^+ + 2e^- \xrightleftharpoons[catalyst]{} Li_2O_2$ (positive electrode)

The positive electrode 54 in a typical cell 50 is a lightweight, electrically conductive material which has a porosity of greater than 80% to allow the formation and deposition/storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 100 μm must have a capacity of about 20 mAh/cm².

Materials which provide the needed porosity include carbon black, graphite, carbon fibers, carbon nanotubes, and other non-carbon materials. There is evidence that each of these carbon structures undergo an oxidation process during charging of the cell, due at least in part to the harsh environment in the cell (pure oxygen, superoxide and peroxide ions, formation of solid lithium peroxide on the cathode surface, and electrochemical oxidation potentials of >3V (vs. $Li/Li^+$)).

While there is a clear benefit to couples that include oxygen as a positive electrode and metals, alloys of metals, or other materials as a negative electrode, none of these couples has seen commercial demonstration thus far because of various challenges. A number of investigations into the problems associated with Li-oxygen batteries have been conducted as reported, for example, by Beattie, S., D. Manolescu, and S. Blair, "High-Capacity Lithium-Air Cathodes," *Journal of the Electrochemical Society*, 2009. 156: p. A44, Kumar, B., et al., "A Solid-State, Rechargeable, Long Cycle Life Lithium-Air Battery," *Journal of the Electrochemical Society*, 2010. 157: p. A50, Read, J., "Characterization of the lithium/oxygen organic electrolyte battery," *Journal of the Electrochemical Society*, 2002. 149: p. A1190, Read, J., et al., "Oxygen transport properties of organic electrolytes and performance of lithium/oxygen battery," *Journal of the Electrochemical Society*, 2003. 150: p. A1351, Yang, X and Y. Xia, "The effect of oxygen pressures on the electrochemical profile of lithium/oxygen battery," *Journal of Solid State Electrochemistry*: p. 1-6, and Ogasawara, T., et al., "Rechargeable $Li_2O_2$ Electrode for Lithium Batteries," *Journal of the American Chemical Society*, 2006. 128(4): p. 1390-1393.

While some issues have been investigated, several challenges remain to be addressed for lithium-oxygen batteries. These challenges include limiting dendrite formation at the lithium metal surface, protecting the lithium metal (and possibly other materials) from moisture and other potentially harmful components of air (if the oxygen is obtained from the air), designing a system that achieves acceptable specific energy and specific power levels, reducing the hysteresis between the charge and discharge voltages (which limits the round-trip energy efficiency), and improving the number of cycles over which the system can be cycled reversibly.

The limit of round trip efficiency occurs due to an apparent voltage hysteresis as depicted in FIG. 4. In FIG. 4, the discharge voltage 70 (approximately 2.5 to 3 V vs. $Li/Li^+$) is much lower than the charge voltage 72 (approximately 4 to 4.5 V vs. $Li/Li^i$). The equilibrium voltage 74 (or open-circuit potential) of the lithium/oxygen system is approximately 3 V. Hence, the voltage hysteresis is not only large, but also very asymmetric.

The large over-potential during charge may be due to a number of causes. For example, reaction between the $Li_2O_2$ and the conducting matrix 62 may form an insulating film between the two materials. Additionally, there may be poor contact between the solid discharge products $Li_2O_2$ or $Li_2O$ and the electronically conducting matrix 62 of the positive electrode 54. Poor contact may result from oxidation of the discharge product directly adjacent to the conducting matrix 62 during charge, leaving a gap between the solid discharge product and the matrix 52.

Another mechanism resulting in poor contact between the solid discharge product and the matrix 62 is complete disconnection of the solid discharge product from the conducting matrix 62. Complete disconnection of the solid discharge product from the conducting matrix 62 may result from fracturing, flaking, or movement of solid discharge product particles due to mechanical stresses that are generated during charge/discharge of the cell. Complete disconnection may contribute to the capacity decay observed for most lithium/oxygen cells. By way of example, FIG. 5 depicts the discharge capacity of a typical Li/oxygen cell over a period of charge/discharge cycles.

Other physical processes which cause voltage drops within an electrochemical cell, and thereby lower energy efficiency and power output, include mass-transfer limitations at high current densities. The transport properties of aqueous electrolytes are typically better than nonaqueous electrolytes, but in each case mass-transport effects can limit the thickness of the various regions within the cell, including the cathode. Reactions among $O_2$ and other metals may also be carried out in various media.

In systems using oxygen as a reactant, the oxygen may either be carried on board the system or obtained from the atmosphere. There are both advantages and disadvantages to operating a battery that reacts gaseous oxygen in a closed format by use of a tank or other enclosure for the oxygen. One advantage is that if the reaction chemistry is sensitive to any of the other components of air (e.g., $H_2O$, $CO_2$), only pure oxygen can be added to the enclosure so that such contaminants are not present. Other advantages are that the use of an enclosure can allow for the operation at a high partial pressure of oxygen at the site of the reaction (for uncompressed atmospheric air the pressure of oxygen is only 0.21 bar), can prevent any volatile species from the leaving the system (i.e., prevent "dry out"), and other advantages. The disadvantages include the need to carry the oxygen at all times, increasing the system mass and volume, potential safety issues associated with high-pressure oxygen, and others.

In order to realize the advantages that come with the use of a closed system in a vehicle it is necessary to compress the oxygen so that the oxygen volume is not too large on board the vehicle. In particular, a pressure in the fully charged state of greater than 100 bar, such as 350 bar (about 5000 psi), is desirable.

What is therefore needed is an economic, efficient, and compact method to compress and store the oxygen produced during the charge of a battery system that consumes oxygen on discharge

SUMMARY

In one embodiment of the disclosure, a vehicular battery system includes an oxygen reservoir having a first outlet and a first inlet, a multistage compressor supported by the vehicle and having a second inlet and a second outlet, the second outlet operably connected to the first inlet, a cooling system operably connected to the multistage compressor and configured to provide a coolant to the multistage compressor to cool a compressed fluid within the multistage compressor, and a vehicular battery system stack including at least one negative electrode including a form of lithium, the vehicular battery system stack having a third inlet removably operably connected to the first outlet, and a third outlet operably connected to the second inlet.

In another embodiment, a method of operating a vehicular battery system includes removably coupling a vehicular battery system stack including at least one positive electrode including a form of lithium to an oxygen reservoir and to a multistage compressor supported by the vehicle, discharging the vehicular battery system stack, transferring oxygen formed by discharging the vehicular battery system stack to the multistage compressor, compressing the transferred oxygen in a first compression stage of the multistage compressor, compressing the compressed oxygen from the first compression stage in a second compression stage of the multistage compressor, providing coolant to the multistage compressor, and transferring the compressed oxygen from the second compression stage to the oxygen reservoir.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
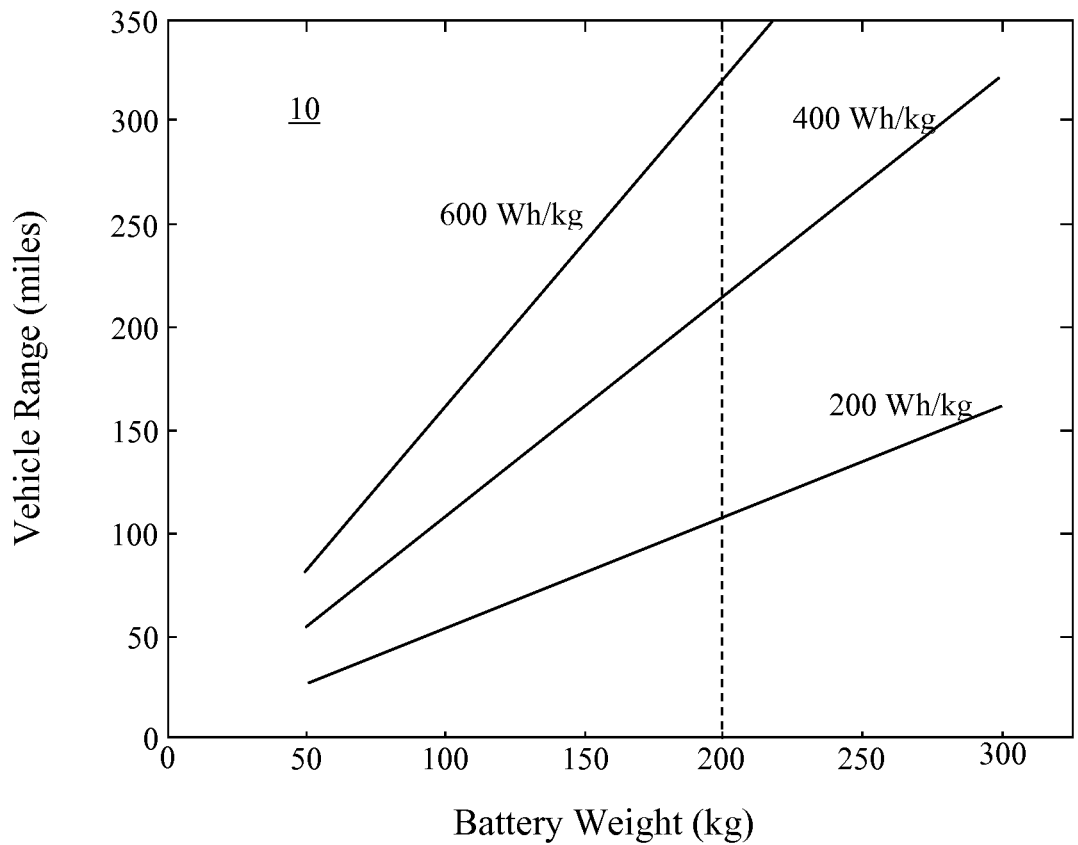
FIG. 1 depicts a plot showing the relationship between battery weight and vehicular range for various specific energies.
Figure 2:
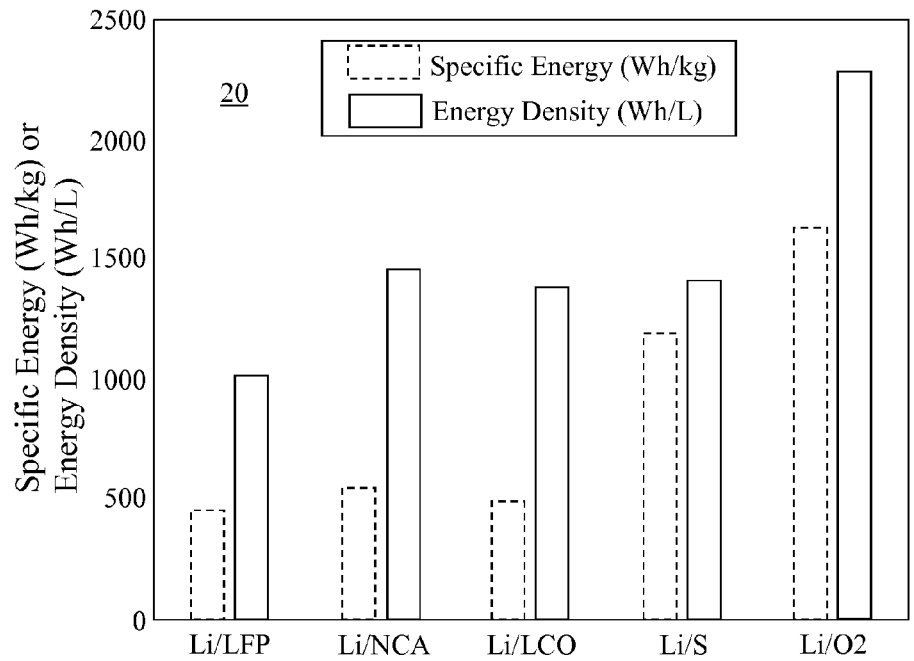
FIG. 2 depicts a chart of the specific energy and energy density of various lithium-based cells.
Figure 3:
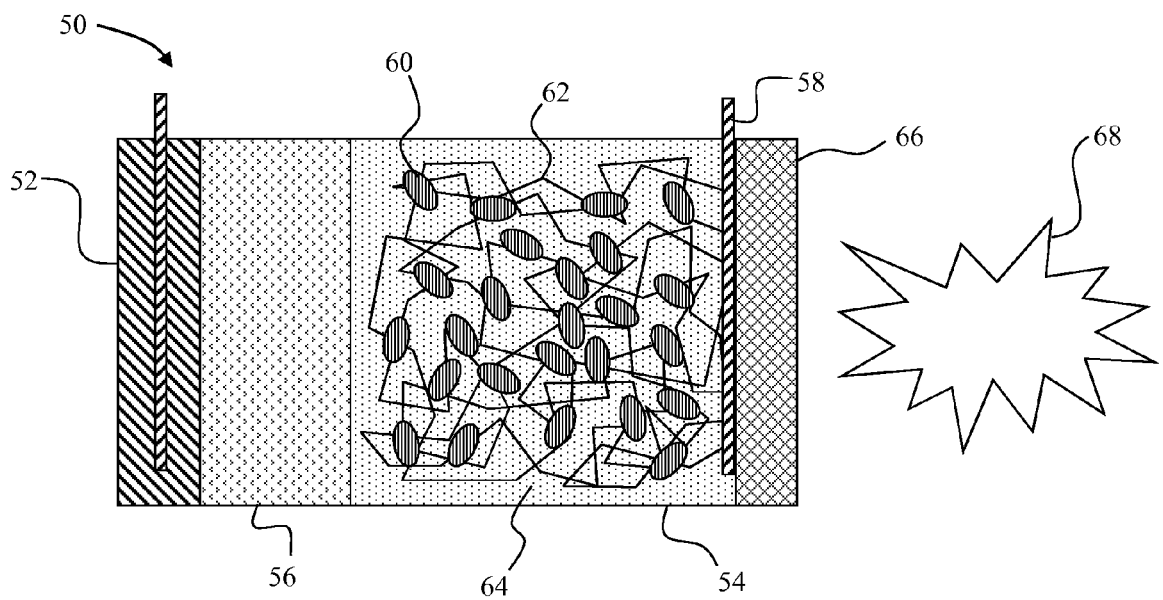
FIG. 3 depicts a prior art lithium-oxygen (Li/oxygen) cell including two electrodes, a separator, and an electrolyte.
Figure 4:
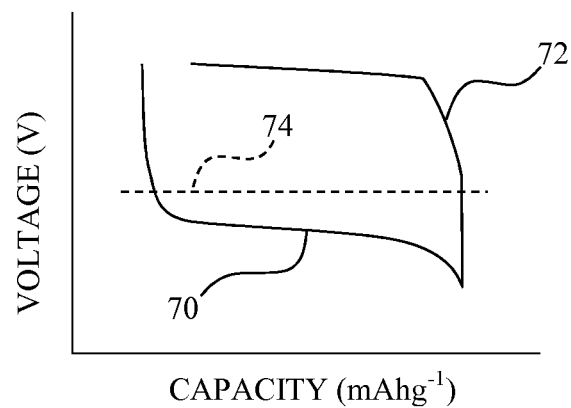
FIG. 4 depicts a discharge and charge curve for a typical Li/oxygen electrochemical cell.
Figure 5:
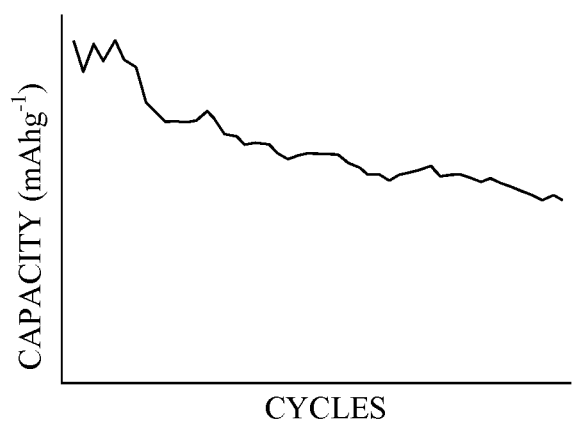
FIG. 5 depicts a plot showing decay of the discharge capacity for a typical Li/oxygen electrochemical cell over a number of cycles.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Figure 6:
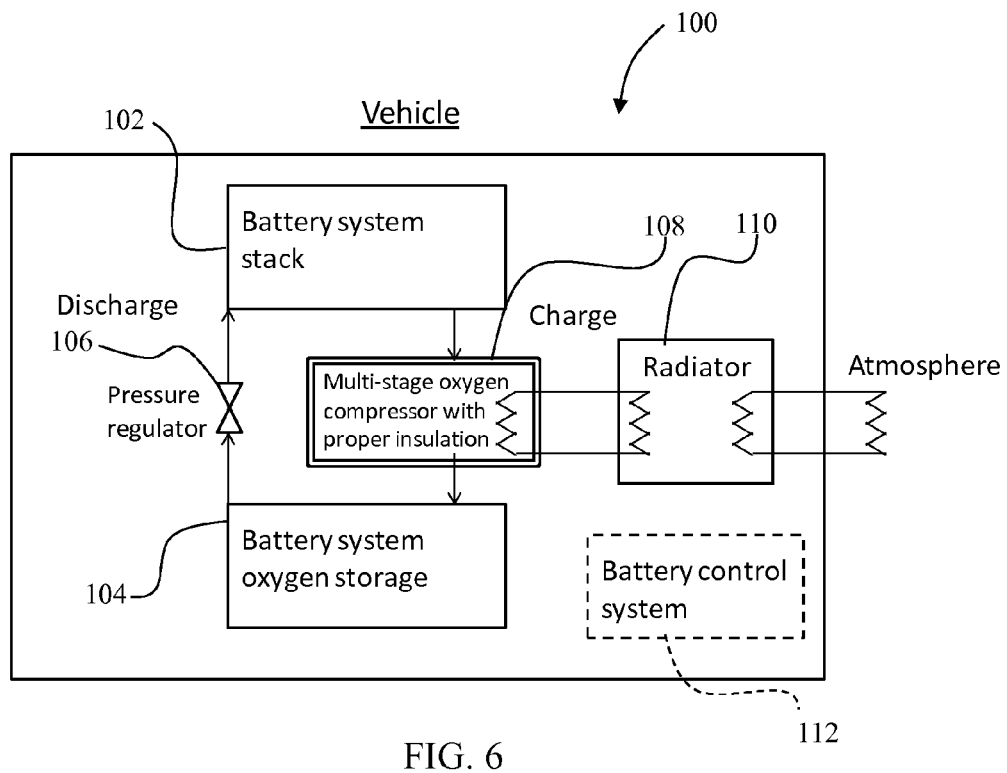
FIG. 6 depicts a schematic view of a vehicle with an adiabatic compressor operably connected to a reservoir configured to exchange oxygen with a positive electrode for a reversible reaction with lithium.

A schematic of vehicle 100 is shown in FIG. 6. The vehicle 100 includes a vehicular battery system stack 102 and an oxygen reservoir 104. A pressure regulator 106 governs provision of oxygen to the battery system stack 102 during discharge while a multi-stage oxygen compressor 108 is used to return oxygen to the oxygen reservoir 104 during charging operations.

The battery system stack 102 includes one or more negative electrodes (not shown) separated from one or more positive electrodes (not shown) by one or more porous separators (not shown). The negative electrode (not shown) may be formed from lithium metal or a lithium-insertion compound (e.g., graphite, silicon, tin, LiAl, LiMg, $Li_4Ti_5O_{12}$), although Li metal affords the highest specific energy on a cell level compared to other candidate negative electrodes. Other metals may also be used to form the negative electrode, such as Zn, Mg, Na, Fe, Al, Ca, Si, and others.

The positive electrode (not shown) in one embodiment includes a current collector (not shown) and electrode particles (not shown), optionally covered in a catalyst material, suspended in a porous matrix (not shown). The porous matrix (not shown) is an electrically conductive matrix formed from a conductive material such as conductive carbon or a nickel foam, although various alternative matrix structures and materials may be used. The separator (not shown) prevents the negative electrode (not shown) from electrically connecting with the positive electrode (not shown).

The vehicular battery system stack 102 includes an electrolyte solution (not shown) present in the positive electrode (not shown) and in some embodiments in the separator (not shown). In some embodiments, the electrolyte solution includes a salt, $LiPF_6$ (lithium hexafluorophosphate), dissolved in an organic solvent mixture. The organic solvent mixture may be any desired solvent. In certain embodiments, the solvent may be dimethyl ether (DME), acetonitrile (MeCN), ethylene carbonate, or diethyl carbonate.

In the case in which the metal is Li, the vehicular battery system stack 102 discharges with lithium metal in the negative electrode ionizing into a $Li^+$ ion with a free electron $e^-$. $Li^+$ ions travel through the separator toward the positive electrode. Oxygen is supplied from the oxygen storage tank 104 through the pressure regulator. Free electrons $e^-$ flow into the positive electrode (not shown).

The oxygen atoms and $Li^+$ ions within the positive electrode form a discharge product inside the positive electrode, aided by the optional catalyst material on the electrode particles. As seen in the following equations, during the discharge process metallic lithium is ionized, combining with oxygen and free electrons to form $Li_2O_2$ or $Li_2O$ discharge product that may coat the surfaces of the carbon particles.

$Li \rightarrow Li^+ + e^-$ (negative electrode)

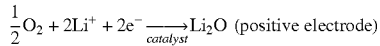

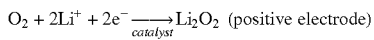

The vehicular battery system stack 102 does not use air as an external source for oxygen. External sources, meaning sources which are not carried by the vehicle such as the atmosphere, include undesired gases and contaminants. Thus, while the oxygen that reacts electrochemically with the metal in a metal/oxygen battery may initially come from the air, the presence of $CO_2$ and $H_2O$ in air make it an unsuitable source for some of the media in which the metal/oxygen reactions are carried out and for some of the products that form. For example, in the reaction of Li with oxygen in which $Li_2O_2$ is formed, $H_2O$ and $CO_2$ can react with the $Li_2O_2$ to form LiOH and/or $Li_2CO_3$, which can deleteriously affect the performance and rechargeability of the battery. As another example, in a basic medium $CO_2$ can react and form carbonates that precipitate out of solution and cause electrode clogging.

In FIG. 6, all of the components are stored on board the vehicle 100. The volatile cell components are fully contained in the system. In some embodiments, the cell is configured to allow for periodic replacement of one or more of the volatile components. For example, shutoff valves (not shown) and couplers (not shown) are provided in some embodiments to allow for isolation and removal of one or more of the tank 104, the vehicular battery stack 102, and the multistage compressor 108. This allows, for example, the easy replacement of failed or depleted components such as battery stacks with depleted electrolyte. Additionally, in the event the compressor fails, oxygen generated during discharge may simply be vented to atmosphere and a replacement oxygen tank inserted to allow for continued battery operation.

The mass and volume of the complete battery system (upper limit for small vehicle) should be <400 kg (>415 Wh/kg)—mass reference value, and <275 L (>600 Wh/L)—volume reference value. The mass of $O_2$ for 165 kWh is 33.3 kg for $Li_2O_2$ and 14.5 kg for $LiOH.H_2O$. The flow rate of $O_2$ for 100 kW at STP, 90% efficiency, stoich=1 is 4.4 L/s of $O_2$ for $Li_2O_2$ and 1.9 L/S for $LiOH.H_2O$. The gas handling power requirement is ideally <5% of the discharge power. With a battery cost target of 100 $/kWh and the gas handling at 20% of battery system, the cost would be 3.00 $/Standard Liter Per Minute (SLPM) of air for $Li_2O_2$.

Figure 7:
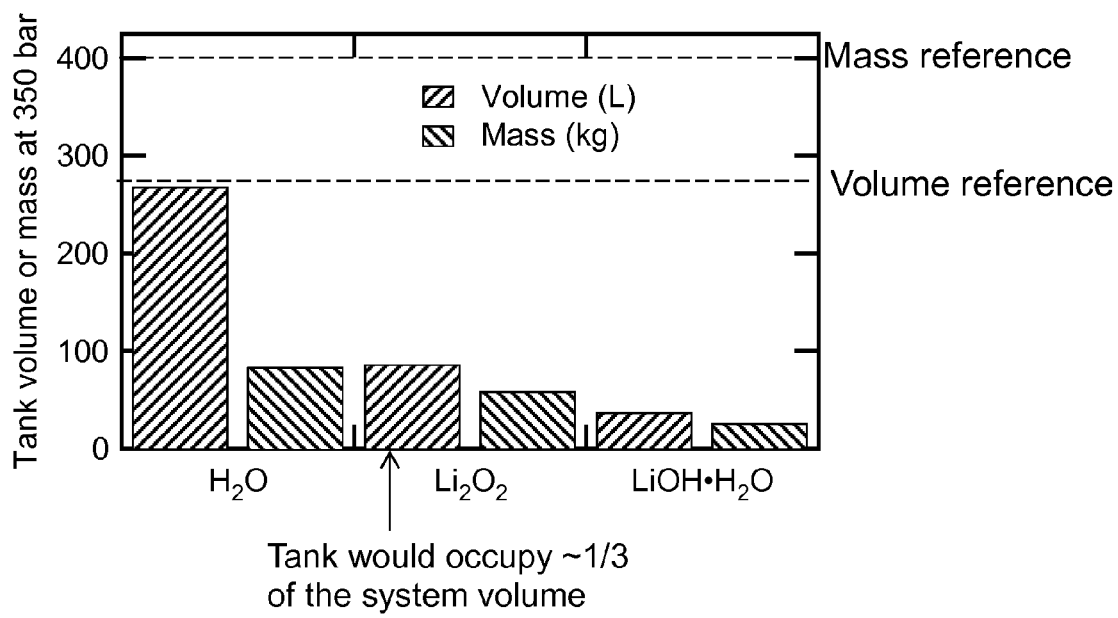
FIG. 7 depicts a chart showing the mass and volume requirements for a carbon fiber $O_2$ storage tank.
Figure 8:
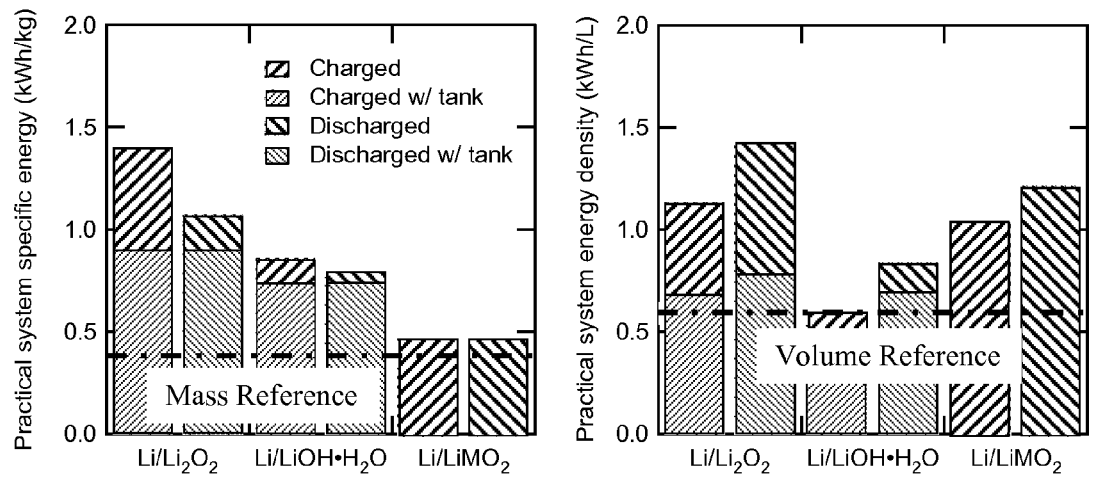
FIG. 8 depicts charts showing the practical system energy and energy density of a system including a carbon fiber tank for a 165 kWh pack, 350 bar tank at ST with L/D of 3, 100 μm electrode for $Li_2O_2$ & $LiMO_2$, 300 μm electrode for $LiOH.H_2O$, 20% excess Li, cell sandwich is 80% of stack mass and 70% of stack volume, $LiMO_2$ capacity is 0.275 Ah/g, Eff. $Li_2O_2$: 90%, Eff. $LiOH.H_2O$: 90%, Eff. $Li/LiMO_2$: 95%.

In the embodiment of FIG. 6, the oxygen storage reservoir 104 is spatially separated from the vehicular battery system stack 102 where the reactions take place, but in other embodiments the oxygen storage is more closely integrated with the stack (for example, incorporated within the cells). In the embodiment of FIG. 6, the oxygen is stored in a tank or other enclosure that is spatially separated from the stack or cells where the reactions are carried out such that a minimal amount of high-pressure housing is required for the vehicle 100. In one embodiment, the storage reservoir 104 is a carbon fiber tank. Carbon fiber tanks with pressures of ~350 and 700 bar have been explored for storing $H_2$ for PEM fuel cells. For a 165 kWh pack, a carbon fiber tank at 350 bar would provide sufficient $O_2$ as indicated by FIGS. 7 and 8.

During discharge (in which oxygen is consumed), the pressure of the oxygen gas is reduced by passing it through the pressure regulator 106 such that the pressure of the oxygen that reaches the stack is close to ambient (i.e., less than about 5 bar). During discharge the compressor 108 does not operate. During charge the compressor 108 is operated to compress the oxygen that is being generated within the stack or cells where the reactions are taking place.

The compressor 108 in various embodiments is of a different type. In one embodiment which is suitable and mature for a vehicle application in which it is desired to pressurize a gas to more than 100 bar in a unit with a compact size, the compressor 108 is a multi-stage rotary compressor. When embodied as a multi-stage rotary compressor, each compression step is nearly adiabatic because it involves the rapid action of a piston to compress the gas. This type of compressor unit is well known. For example, U.S. Pat. No. 6,089,830 which issued Jul. 18, 2000, the entire contents of which are herein incorporated by reference, discloses a multistage rotary compressor. Commercial units of the appropriate size are widely available at a reasonable cost; they are used for a variety of applications that require air compression.

Figure 9:
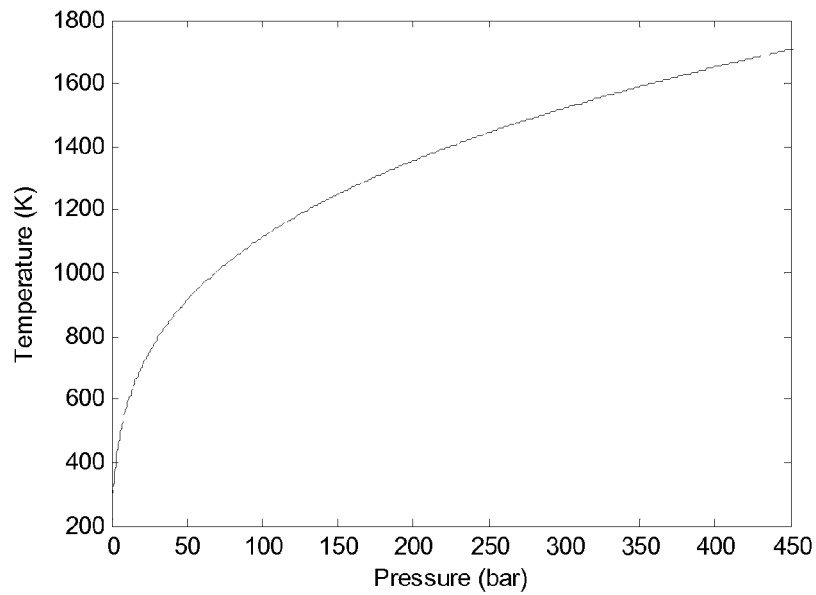
FIG. 9 depicts a chart showing the increase in temperature when a gas is adiabatically compressed starting from a pressure of 1 bar and a temperature of 298.15 K with constant gas properties (i.e., gamma) assumed.

Because each stage of the compressor is nearly adiabatic, in addition to an increase in the pressure there is also an increase in the temperature, as explained with reference to FIG. 9. FIG. 9 shows the temperature at the end of a single adiabatic compression step starting at a pressure of 1 bar and a temperature of 298.15 K assuming constant gas properties. The figure shows that it is impractical to use a single compression step to achieve a pressure of, for example, 350 bar, because the output temperature would be far too high to inject into a tank of standard materials, which in turn is integrated in a vehicle that may have heat-sensitive components. In addition, the final pressure shown in FIG. 9 is for the temperature at the end of the compression step; thus, after cooling, the pressure will fall. It is important for the temperature of the compressed gas released into the tank to be within a certain range so that it is compatible with the tank material, which in different embodiments is a metal such as aluminum or a polymer, depending on the type of tank.

In order to prevent the temperature from rising too high it is necessary to cool the gas at the end of each adiabatic compression step. This is accomplished using the radiator 110 shown in FIG. 6. The radiator 110 in some embodiments is the same radiator that is used to cool the battery system stack; in such embodiments the heat exchange loop also extends into the other components of the battery system such as the battery system stack 102 and battery system oxygen storage 104. Typically, fluid is passed through the oxygen compressor 108, removing heat from the oxygen gas after each compression step and bringing the temperature towards that of the radiator fluid. The fluid is passed through the radiator 110 where heat is exchanged with the atmosphere. The compressor is also insulated to prevent the exposure of other parts of the battery system or the vehicle 100 to high temperatures.

Figure 10:
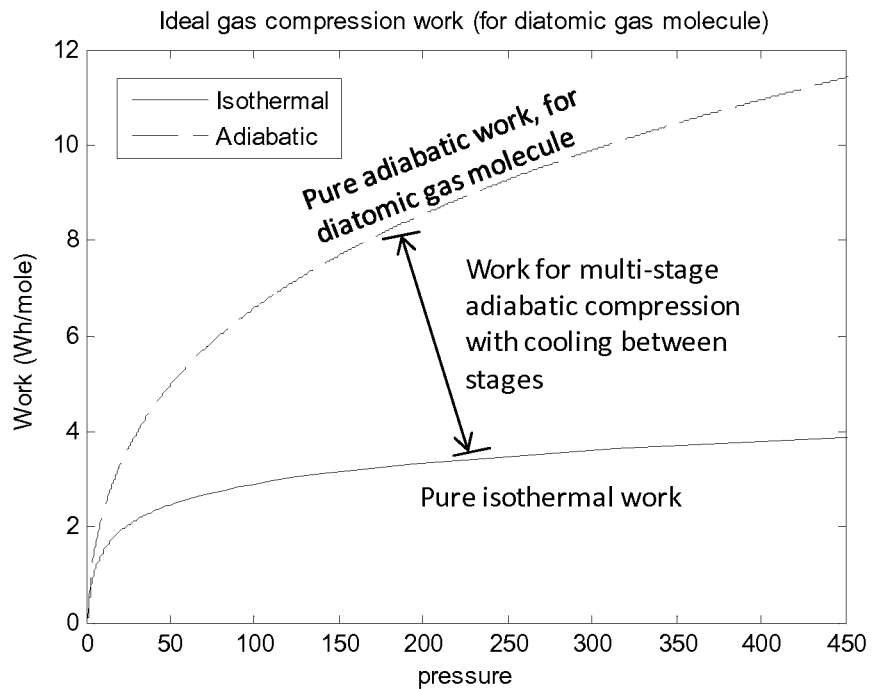
FIG. 10 depicts a chart showing compression work for an ideal gas (diatomic and constant properties are assumed for adiabatic) as a function of pressure with the initial pressure at one bar.

The cooling of the oxygen after each compression step allows the system to operate closer to the isothermal compression work line shown in FIG. 10. In particular, FIG. 10 shows the difference in the work required for a single-stage adiabatic compression (assuming a diatomic gas and constant properties) compared to the compression work required for isothermal compression. As the figure shows, significantly more work is required for adiabatic compression than isothermal compression. For a multi-stage adiabatic compression process with cooling between stages the amount of work required is between the pure isothermal and single-stage adiabatic lines. Thus, the amount of work required for the compression can be lowered compared to adiabatic compression by using multiple compression stages with cooling of the gas at the end of each compression.

The magnitude of the compression energy compared to the reaction energy also depends on the negative electrode material with which oxygen is reacting. For example, if the oxygen is reacting with Li to form $Li_2O_2$ on discharge, the reaction energy is 159 Wh/mole $O_2$. Thus, if the charging process takes place with 85% efficiency, about 24 Wh/mole $O_2$ would be required for cooling for the reaction, suggesting that the amount of cooling required for the compression should be smaller than that required for cooling the stack or cells.

In some embodiments, some or all of the oxygen generated during charge is vented to atmosphere. For example, in situations where extreme temperature changes are experienced, the tank may approach an overpressure condition during recharge, or the maximum pressure capability of the compressor may be reached. Depending upon the particular embodiment, one or more vents (not shown) may be positioned between the battery system stack 102 and the compressor 108, after one or more compression stages in the compressor 108, or on the oxygen storage reservoir 104. In some embodiments, one or more of the vents are automatic vents, while in some embodiments one or more of the vents are under control of the battery control system 112.

In some of these embodiments, a gas regeneration system is used to provide supplemental oxygen during discharge. In other embodiments, a replacement oxygen tank is provided. The free energy of separating the 5 highest-concentration species in air ($N_2$, $O_2$, $H_2O$, Ar, $CO_2$) is <0.5 Wh/mol air, which is lower than the compression energy for 1 to 350 bar (~3.50 Wh/mol). Most of the free energy is associated with separating $O_2$ and $N_2$, which in some embodiments is not done. Consequently, less than 2 kW are required theoretically for this separation for a 100 kW discharge forming $Li_2O_2$.

In the embodiment of FIG. 6, all processes associated with the operation of the battery system are controlled by a battery control system 112. The battery control system 112 controls the flow rate of the fluid that is passed through the radiator 110 and the oxygen compressor 108 and possibly other components on the vehicle 100. The battery control system 112 includes a memory (not shown) in which program instructions are stored and a processor (not shown) which executes the program instructions to control the temperature of the oxygen which is compressed into the storage system 104. The processor is operatively connected to temperature sensors (not shown) in the battery system stack 102, the oxygen storage 104, the radiator 110, and at various stages in the compressor 108 in order to more precisely control the system. In some embodiments, more or fewer temperature sensors are included. A schematic that shows how the temperatures are used by the battery control system 112 is shown in FIG. 11.

Figure 11:
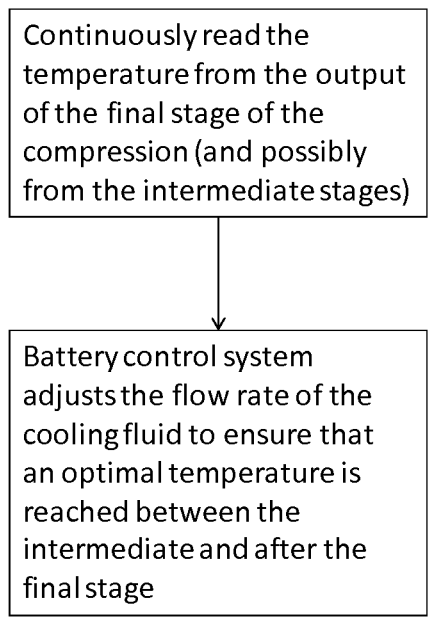
FIG. 11 depicts a process for how the temperature of the final compressed gas or of the gas at an intermediate stage is used by the battery control system to change the flow rate of the cooling fluid to ensure the correct final temperature is reached.

In FIG. 11, the processor obtains a signal indicative of the temperature at the output of the compressor 108 and controls the flow rate of fluid based upon the obtained temperature. In some embodiments, the temperature of one or more intermediate stages of the compressor 108 is obtained, and cooling flow throw the particular stages is modified based upon the temperature. In some embodiments, the temperature of the cooling fluid is obtained, and used to determine or control the flow rate of the cooling fluid.

The battery system stack 102 thus makes use of oxygen (which may be pure or contain additional components) stored within a battery cell or external to a cell in a tank or other volume. The oxygen reacts electrochemically with the metal (which may include Li, Zn, Mg, Na, Fe, Al, Ca, Si, and others) to produce energy on discharge, and on charge the metal is regenerated and oxygen gas (and perhaps other species, such as $H_2O$) are evolved.

Beneficially, the battery system in the vehicle 100 is thus a completely closed system and species present in ambient air (e.g., $H_2O$, $CO_2$, and others) that may be detrimental to the cell operation are excluded. The battery system provides electrochemical compression of oxygen on charge, and the use of compressed oxygen on discharge, to reduce energy losses associated with mechanical oxygen compression (which is typically carried out adiabatically, including in a multi-stage adiabatic process) and to reduce the cost and complexity of a mechanical compressor. The components of the battery system are configured to handle the pressure of the compressed oxygen, including flow fields, bipolar plates, electrodes, separators, and high-pressure oxygen lines.

The battery system in some embodiments includes high-pressure seals, an electrode, gas-diffusion layer, and flow field design that provide sufficient mechanical support to prevent pressure-induced fracture or bending (including with pressure cycling) that would be deleterious to cell performance and life, and a separator that is impervious to oxygen (even at high pressures, including up to 350 bar or above). The minimum pressure in some embodiments is chosen to eliminate delamination of cell components from one another. The minimum pressure in some embodiments is chosen to reduce mass transfer limitations and thereby increase the limiting current.

The above described system provides a number of advantages. For example, the use of a multi-stage compressor results in a vehicle with a battery system that is smaller and more economical, and with a higher efficiency, than other compression strategies.

Additionally, a higher oxygen pressure in the tank can be achieved if the compressor is properly cooled than if there is not a good cooling solution. In addition the compression can be carried out more efficiently if the oxygen can be adequately cooled between each stage.

Moreover, the vehicle can be charged using only a wall outlet if a compressor is integrated into the vehicle system itself rather than stored externally from the vehicle.

Integration of the compressor on the vehicle allows for a completely closed gas handling system. If a compressor is stored separately from the vehicle a connection between the external compressor and the gas handling system on the vehicle may introduce contamination.

While the disclosure has been illustrated and described in detail in the drawings and foregoing description, the same should be considered as illustrative and not restrictive in character. Only the preferred embodiments have been presented and all changes, modifications and further applications that come within the spirit of the disclosure are desired to be protected.

What is claimed is:

1. A vehicular battery system comprising:
   an oxygen reservoir having a first outlet and a first inlet;
   a multistage compressor supported by the vehicle and having a second inlet and a second outlet, the second outlet operably connected to the first inlet;
   a cooling system operably connected to the multistage compressor and configured to provide a coolant to the multistage compressor to cool a compressed fluid within the multistage compressor; and
   a vehicular battery system stack including at least one negative electrode including a form of lithium, the vehicular battery system stack having a third inlet removably operably connected to the first outlet, and a third outlet operably connected to the second inlet.

2. The vehicular battery system of claim 1, wherein:
the first inlet is removably operably connected to the second outlet.

3. The vehicular battery system of claim 2, further comprising:
a vent operably connected to the vehicular battery system.

4. The vehicular battery system of claim 3, wherein the vent is positioned on the oxygen reservoir.

5. The vehicular battery system of claim 3, wherein the vent is positioned on the multistage compressor.

6. The vehicular battery system of claim 1, wherein the oxygen reservoir is located within the vehicular battery system stack.

7. The vehicular battery system of claim 1, wherein the oxygen reservoir comprises a carbon fiber tank spatially separated from the vehicular battery system stack.

8. The vehicular battery system of claim 1, further comprising:
at least one sensor configured to generate a signal associated with a temperature within the vehicular battery system;
a memory; and
a processor operably connected to the memory, the at least one sensor, and the cooling system, the processor configured to execute program instructions stored within the memory to:
obtain the signal generated by the at least one sensor, and
control a flow of the coolant to the multistage compressor based upon the obtained signal.

9. The vehicular battery system of claim 8, wherein:
the at least one sensor includes a first sensor located at the second outlet; and
the processor is further configured to execute the program instructions to
obtain a first signal generated by the first sensor, and
control the flow of the coolant to the multistage compressor based upon the obtained first signal.

10. The vehicular battery system of claim 9, wherein:
the multistage compressor includes a first compression stage and a second compression stage;
a cooler is located between the first compression stage and the second compression stage;
the at least one sensor includes a second sensor located between the first compression stage and the second compression stage; and
the processor is further configured to execute the program instructions to
obtain a second signal generated by the second sensor, and
control a flow of the coolant to the cooler based upon the obtained second signal.

11. A method of operating a vehicular battery system comprising:
removably coupling a first vehicular battery system stack including at least one positive electrode including a form of lithium to a first oxygen reservoir and to a multistage compressor supported by the vehicle;
charging the first vehicular battery system stack;
transferring oxygen formed by charging the first vehicular battery system stack to the multistage compressor;
compressing the transferred oxygen in a first compression stage of the multistage compressor;
compressing the compressed oxygen from the first compression stage in a second compression stage of the multistage compressor;
providing coolant to the multistage compressor;
cooling the compressed oxygen from the first compression stage with the coolant; and
transferring the compressed oxygen from the second compression stage to the first oxygen reservoir.

12. The method of claim 11, further comprising:
removably coupling the first oxygen reservoir to the multistage compressor.

13. The method of claim 12, further comprising:
decoupling the first oxygen reservoir from the multistage compressor and the first vehicular battery system stack; and
removably coupling a second oxygen reservoir to the multistage compressor and the first vehicular battery system stack.

14. The method of claim 12, further comprising:
venting oxygen generated by the charging of the first vehicular battery system stack.

15. The method of claim 14, wherein venting oxygen comprises venting oxygen from the first oxygen reservoir.

16. The method of claim 15, wherein venting oxygen comprises venting oxygen from the multistage compressor.

17. The method of claim 11, further comprising:
providing supplemental oxygen to the first vehicular battery system stack during a discharge of the first vehicular battery system stack.

18. The method of claim 11, further comprising:
decoupling the first vehicular battery system stack from the oxygen reservoir and from the multistage compressor; and
removably coupling a second vehicular battery system stack including at least one positive electrode including a form of lithium to the first oxygen reservoir and to the multistage compressor after decoupling the first vehicular battery system stack.

19. The method of claim 11, wherein transferring the compressed oxygen from the second compression stage to the first oxygen reservoir comprises:
transferring the compressed oxygen from the second compression stage to a carbon fiber tank spatially separated from the first vehicular battery system stack.

20. The method of claim 11, further comprising:
obtaining a signal generated by at least one sensor associated with the vehicular battery system; and
controlling a flow of the coolant to the multistage compressor with a battery control system based upon the obtained signal.

* * * * *